United States Patent
Shrestha et al.

(10) Patent No.: US 11,102,764 B2
(45) Date of Patent: Aug. 24, 2021

(54) MINIMIZATION OF PADDING AND RESOURCE WASTAGE IN MESSAGE 3 (MSG3) FOR EARLY DATA TRANSMISSION (EDT)

(71) Applicant: Apple Inc, Cupertino, CA (US)

(72) Inventors: Bharat Shrestha, Hillsboro, OR (US); Qiaoyang Ye, Fremont, CA (US); Seau S. Lim, Swindon (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/254,988

(22) Filed: Jan. 23, 2019

(65) Prior Publication Data

US 2019/0159197 A1 May 23, 2019

Related U.S. Application Data

(60) Provisional application No. 62/627,397, filed on Feb. 7, 2018.

(51) Int. Cl.
| | |
|---|---|
| *H04W 52/00* | (2009.01) |
| *H04W 72/04* | (2009.01) |
| *H04W 74/08* | (2009.01) |
| *H04L 1/18* | (2006.01) |
| *H04W 72/02* | (2009.01) |
| *H04W 72/14* | (2009.01) |

(52) U.S. Cl.
CPC ....... *H04W 72/0413* (2013.01); *H04L 1/1887* (2013.01); *H04W 72/02* (2013.01); *H04W 74/0833* (2013.01); *H04W 74/0866* (2013.01); *H04W 72/14* (2013.01)

(58) Field of Classification Search
CPC ............. H04W 72/0413; H04W 72/02; H04W 74/0833; H04W 74/0866; H04W 72/14; H04L 1/1887
USPC ........................................................ 370/329
See application file for complete search history.

(56) References Cited

U.S. PATENT DOCUMENTS

| | | | |
|---|---|---|---|
| 2019/0037447 A1* | 1/2019 | Lee | ........................ H04W 28/18 |
| 2019/0104553 A1* | 4/2019 | Johansson | ................. H04L 1/12 |
| 2019/0159257 A1* | 5/2019 | Alvarino | ........... H04W 74/0833 |
| 2019/0215872 A1* | 7/2019 | Park | ................... H04W 52/0216 |
| 2020/0187242 A1* | 6/2020 | Hoglund | ............. H04W 52/365 |

* cited by examiner

*Primary Examiner* — Sai Ming Chan
(74) *Attorney, Agent, or Firm* — Kowert Hood Munyon Rankin and Goetzel PC

(57) ABSTRACT

User equipment (UE) includes processing circuitry. To configure the UE for early data transmission (EDT), the processing circuitry is to encode a physical random access channel (PRACH) preamble for transmission to a base station as a PRACH procedure Message 1 (MSG1), the PRACH preamble including a request for EDT. A random-access response (RAR) message is decoded, the RAR message received from the base station as a PRACH procedure Message 2 (MSG2) and including an uplink (UL) grant for the EDT with a transmission block size (TBS) indicator. A TBS is selected from a plurality of available TBSs corresponding to the TBS indicator. UL data is encoded for the EDT to the base station as a PRACH procedure Message 3 (MSG3) using the UL grant and the selected TBS.

20 Claims, 13 Drawing Sheets

602

| $I_{TBS}$ | $N_{PRB}$ | |
|---|---|---|
| | 3 | 6 |
| 0 | 56 | 152 |
| 1 | 88 | 208 |
| 2 | 144 | 256 |
| 3 | 176 | 328 |

604

| $I'_{TBS}$ | $N_{PRB}$ | |
|---|---|---|
| | 3 | 6 |
| 0 | 88 | 208 |
| 1 | 176 | 328 |
| 2 | 224 | 504 |
| 3 | 328 | 712 |

606

| $I''_{TBS}$ | $N_{PRB}$ | |
|---|---|---|
| | 3 | 6 |
| 0 | 56 | 152 |
| 1 | 144 | 256 |
| 2 | 208 | 408 |
| 3 | 256 | 600 |

FIG. 6

| MCS Index $I_{MCS}$ | Modulation $\Delta f = 3.75 kHz$ or $\Delta f = 15 kHz$ and $I_{sc} = 0, 1, \ldots, 11$ | Modulation $\Delta f = 15 kHz$ and $I_{sc} > 11$ | Number of RUs $N_{RU}$ | TBS |
|---|---|---|---|---|
| '000' | pi/2 BPSK | QPSK | 4 | 88 bits |
| '001' | pi/4 QPSK | QPSK | 3 | 88 bits |
| '010' | pi/4 QPSK | QPSK | 1 | 88 bits |
| '011' | pi/2 BPSK | QPSK | 8 | 328 bits |
| '100' | pi/4 QPSK | QPSK | 6 | 328 bits |
| '101' | pi/4 QPSK | QPSK | 4 | 328 bits |
| '110' | pi/4 QPSK | QPSK | 2 | 328 bits |
| '111' | reserved | reserved | reserved | reserved |

FIG. 7A

| MCS Index $I_{MCS}$ | Modulation $\Delta f = 3.75 kHz$ or $\Delta f = 15 kHz$ and $I_{sc} = 0, 1, \ldots, 11$ | Modulation $\Delta f = 15 kHz$ and $I_{sc} > 11$ | Number of RUs $N_{RU}$ | TBS |
|---|---|---|---|---|
| '000' | pi/2 BPSK | QPSK | 8 | 328 bits |
| '001' | pi/4 QPSK | QPSK | 6 | 328 bits |
| '010' | pi/4 QPSK | QPSK | 4 | 328 bits |
| '011' | pi/4 QPSK | QPSK | 2 | 328 bits |
| '100' | pi/2 BPSK | QPSK | 10 | 680 bits |
| '101' | pi/4 QPSK | QPSK | 8 | 680 bits |
| '110' | pi/4 QPSK | QPSK | 5 | 680 bits |
| '111' | pi/4 QPSK | QPSK | 3 | 680 bits |

| MCS Index $I_{MCS}$ | Modulation $\Delta f = 3.75kHz$ or $\Delta f = 15kHz$ and $I_{sc} = 0, 1, \ldots, 11$ | Modulation $\Delta f = 15kHz$ and $I_{sc} > 11$ | Number of RUs $N_{RU}$ | TBS |
|---|---|---|---|---|
| '000' | pi/2 BPSK | QPSK | 10 | 680 bits |
| '001' | pi/4 QPSK | QPSK | 8 | 680 bits |
| '010' | pi/4 QPSK | QPSK | 5 | 680 bits |
| '011' | pi/4 QPSK | QPSK | 3 | 680 bits |
| '100' | pi/4 QPSK | QPSK | 10 | 1000 bits |
| '101' | pi/4 QPSK | QPSK | 8 | 1000 bits |
| '110' | pi/4 QPSK | QPSK | 6 | 1000 bits |
| '111' | pi/4 QPSK | QPSK | 4 | 1000 bits |

FIG. 7C

MINIMIZATION OF PADDING AND
RESOURCE WASTAGE IN MESSAGE 3
(MSG3) FOR EARLY DATA TRANSMISSION
(EDT)

PRIORITY CLAIM

This application claims the benefit of priority to the U.S. Provisional Patent Application Ser. No. 62/627,397, filed Feb. 7, 2018, and entitled "MINIMIZATION OF PADDING ISSUE AND RESOURCE WASTAGE," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for minimization of padding and resource wastage in Message 3 (MSG3) for early data transmission (EDT).

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LTE systems in the licensed as well as unlicensed spectrum is expected in future releases and 5G systems. Such enhanced operations can include techniques to address minimization of padding and resource wastage in MSG3 for EDT.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 6 illustrates an example of multiple TBS tables for Even-Further-Enhanced Machine Type Communications (eFeMTC) Coverage Enhancement (CE) mode B, in accordance with some aspects.

FIG. 7A, FIG. 7B, and FIG. 7C illustrate multiple TBS tables for Further Enhanced Narrowband Internet-of-Things (FeNB-IoT) communications, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
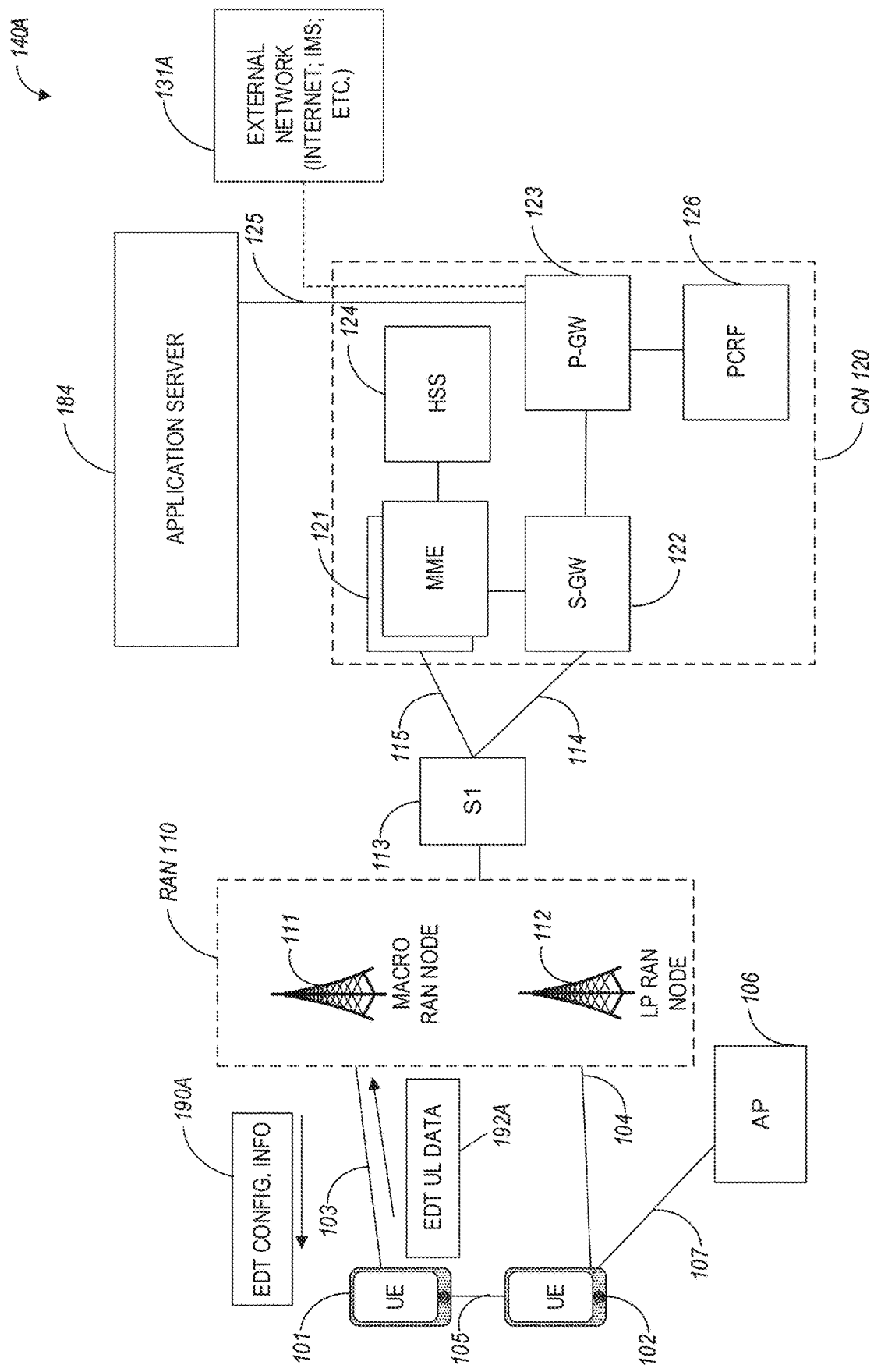
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

1 Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can support connectivity to a 5G core network (5GCN) and can be configured to operate with Early Data Transmission (EDT) in a communication architecture that supports one or more of Machine Type Communications (MTC), enhanced MTC (eMTC), further enhanced MTC (feMTC), even further enhanced MTC (efeMTC), and narrowband Internet-of-Things (NB-IoT) communications. When operating with EDT, a physical random access channel (PRACH) procedure message 3 (MSG3) can be used to carry the short uplink (UL) data and PRACH procedure message 4 (MSG4) can be used to carry short downlink (DL) data (if any is available). When a UE wants to make a new RRC connection, it first transmits one or more preambles, which can be referred to as PRACH procedure message 1 (MSG1). The MSG4 can also indicate UE to immediately go to IDLE mode. For this purpose, the transport block size (TBS) scheduled by the UL grant received for the MSG3 to transmit UL data for EDT needs to be larger than the TBS scheduled by the legacy grant. In some aspects, the UE can indicate its intention of using the early data transmission via MSG1 using a separate PRACH resource partition. From MSG1, eNB knows that it has to provide a grant scheduling TBS values that may differ from legacy TBS for MSG3 in the random-access response (RAR or MSG2) so that the UE can transmit UL data in MSG3 for EDT. However, the eNB may not exactly know what would be the size of UL data the UE wants to transmit for EDT and how large a UL grant for MSG3 would be needed, though a minimum and a maximum TBS for the UL grant could be defined. The following two scenarios may occur: (a) The UL grant provided in RAR is larger than the UL data plus header. In this case, layer 1 needs to add one or more padding bits in the remaining grant. However, transmitting a large number of padding bits (or useless bits) is not power efficient especially in deep coverage where a larger number of repetitions of transmission is required. (b) Similarly, when the UL grant provided in RAR is large but falls short to accommodate the UL data for the EDT, the UE may have to send only the legacy RRC message to fallback to legacy RRC connection. In this case, UE may again need to transmit a number of padding bits, which can be inefficient.

As used herein, the term "PRACH procedure" can be used interchangeably with the term "Ransom Access procedure" or "RA procedure".

In some aspects and as described hereinbelow, EDT configuration information 190A can be communicated from the RAN 110 (e.g., from the eNB 111) to the UE 101 during, e.g., a PRACH procedure. In some aspects, the EDT configuration information 190A can include implicit multiple uplink grants so that the UE can select a TBS for transmitting uplink data 192A during EDT. The TBS and the uplink grant can be selected by the UE 101 based on the size of the EDT uplink data 192A.

In some aspects, MSG1 can be used to indicate the size of the UL data that UE 101 intends to transmit. For this purpose, additional PRACH resource partitioning may be required which may impact the system capacity. In another aspect, multiple UL grants can be provided in RAR (MSG2), i.e., one legacy UL grant and one or more other UL grants that may schedule larger TBS for EDT of UL data in MSG3. If these multiple grants are transmitted explicitly, the size of MSG2 would increase, which may impact the MSG2 detection performance, increase the DL overhead, and consume more UE power due to a potentially larger number of repetitions needed for MSG2 detection. In another aspect, implicit multiple UL grants can be provided by the RAR (MSG2) in the response to an EDT request communicated in MSG1. In this case, the UE can choose the TBS associated with one of the implicit UL grants that fits best the size of the EDT UL data. In some aspects, techniques disclosed herein can be used for configuring implicit multiple UL grants with the same resource to minimize the padding and without wasting transmission resource.

Figure 1B:
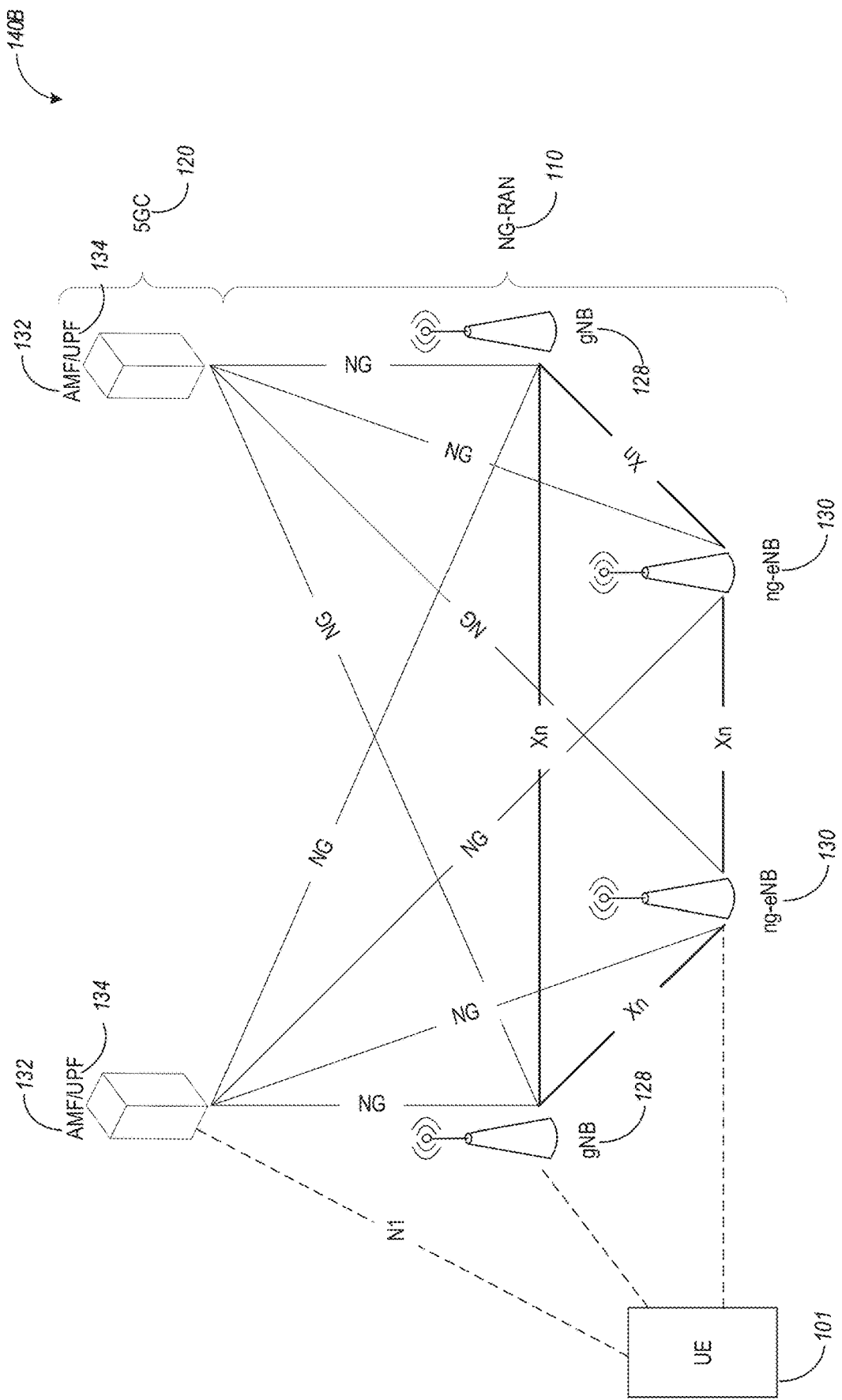
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, the NG system architecture 140B can use reference points between various nodes as provided by 3GPP Technical Specification (TS) 23.501 (e.g., V15.4.0, 2018-12).

In some aspects, each of the gNBs 128 and the NG-eNBs 130 can be implemented as a base station, a mobile edge server, a small cell, a home eNB, and so forth.

In some aspects, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
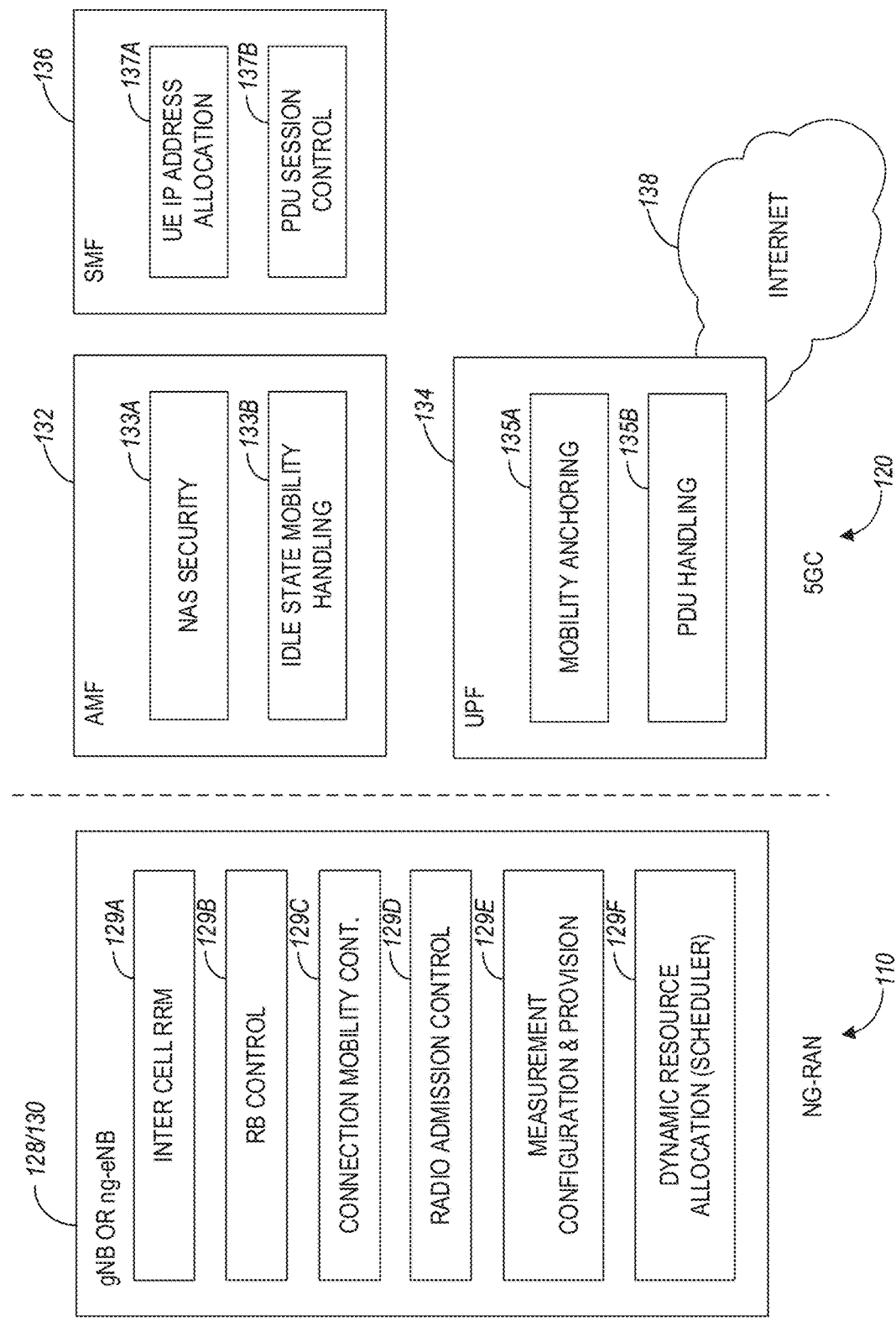
FIG. 1C illustrates a functional split between next generation radio access network (NG-RAN) and the 5G Core network (5GC), in accordance with some aspects.

FIG. 1C illustrates a functional split between NG-RAN and the 5G Core (5GC) in accordance with some aspects. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
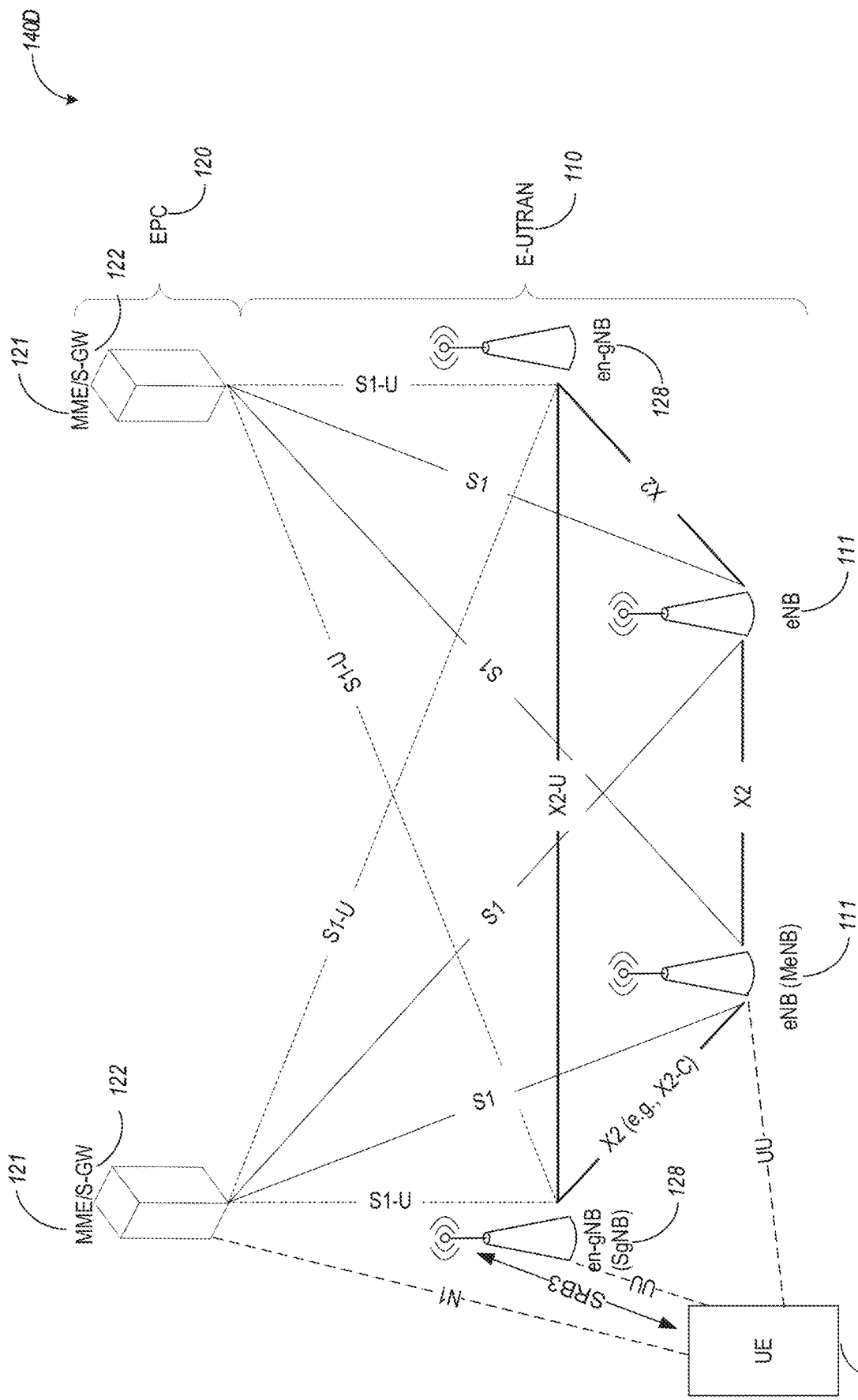
FIG. 1D illustrates an example Evolved Universal Terrestrial Radio Access (E-UTRA) New Radio Dual Connectivity (EN-DC) architecture, in accordance with some aspects.

FIG. 1D illustrates an example Evolved Universal Terrestrial Radio Access (E-UTRA) New Radio Dual Connectivity (EN-DC) architecture, in accordance with some aspects. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some aspects, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some aspects, the MeNB 111 can be connected to the MME 121 via S1-MME interface and to the SgNB 128 via an X2-C interface. In some aspects, the MeNB 111 can be connected to the SGW 122 via S1-U interface and to the SgNB 128 via an X2-U interface. In some aspects associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

Figure 2:
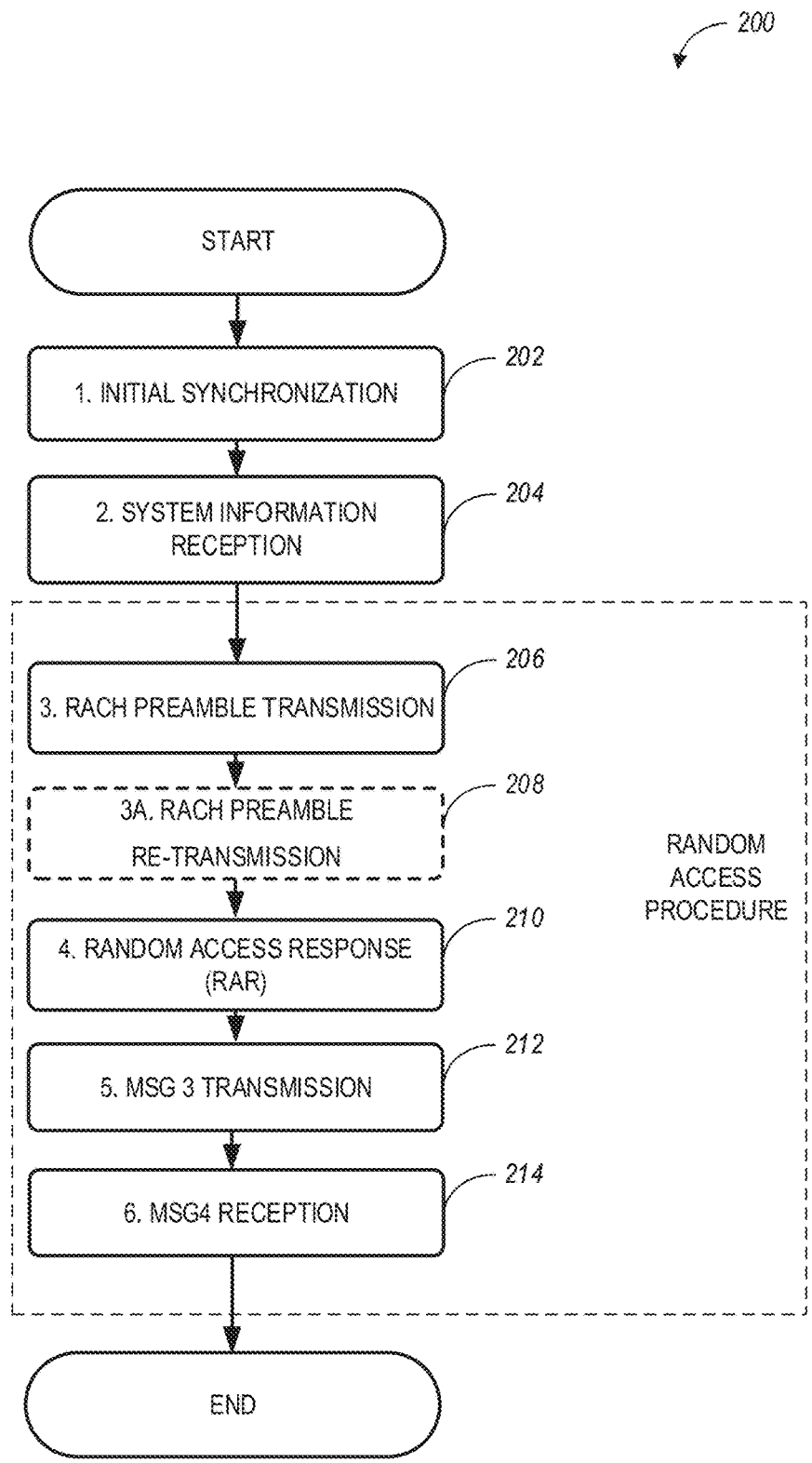
FIG. 2 is an illustration of a physical random access channel (PRACH) procedure that can be used to configure early data transmission (EDT), in accordance with some aspects.

FIG. 2 is an illustration of a physical random access channel (PRACH) procedure 200 that can be used to configure early data transmission (EDT), in accordance with some aspects. Referring to FIG. 2, the PRACH procedure 200 can start with operation 202, when initial synchronization can take place. For example, the UE 101 can receive a primary synchronization signal and a secondary synchronization signal to achieve the initial synchronization. At operation 204, the UE 101 can receive system information, such as one or more system information blocks (SIBs) and/or master information blocks (MIBs). In some aspects, one or more of the SIBs received by the UE during operation 204 can include mapping of a maximum transport block size (TBS) (which can be communicated in PRACH procedure Message 2 (MSG2) in operation 210, as part of the uplink grant for sending Message 3 (MSG3) in operation 212) to one or more TBSs (that can be smaller than the maximum TBS). The UE can select one of the smaller TBSs for early data transmission (EDT) of uplink (UL) data, based on the size of the UL data.

At operation 206 through 214, a physical random access channel (PRACH) procedure can take place. More specifically, at operation 206, a PRACH preamble transmission can take place as PRACH procedure message 1 (MSG1). In some aspects, the MSG1 can be a dedicated (or reserved) preamble that can indicate a request by the UE for EDT (e.g., during MSG3 transmission).

At operation 210, the UE 101 can receive a random access response (RAR) message, which can be a PRACH procedure message 2 (MSG2). In MSG2, the node (e.g., gNB) 111 can respond with random access radio network temporary identifier (RA-RNTI), which can be calculated from the preamble resource (e.g., time and frequency allocation) as well as other configuration information including UL grant information for the MSG3.

In some aspects, UE 101 can be configured to perform one or more retransmissions of the PRACH preamble at operation 208, when the RAR is not received or detected within a preconfigured or predefined time window. The PRACH preamble retransmission can take place with power ramping, as explained hereinbelow so that the transmission power is increased until the random-access response is received.

In some aspects, the MSG2 in operation 210 can implicitly provide multiple UL grants (e.g., multiple TBSs can be provided implicitly, as explained herein, with the UE selecting one of the TBSs (e.g., based on EDT UL data size) for EDT of UL data in MSG3 transmission).

At operation 212, the UE 101 can transmit a PRACH procedure Message 3 (MSG3), which can include a radio resource control (RRC) connection request message. In some aspects, the MSG3 can include an early data transmission (EDT) of UL data using the UL grant as indicated by MSG2.

At operation 214, a PRACH procedure message 4 (MSG4) can be received by the UE 101, which can include an RRC connection setup message, carrying the cell radio network temporary identifier (CRNTI) used for subsequent communication between the UE 101 and the node 111.

Figure 3:
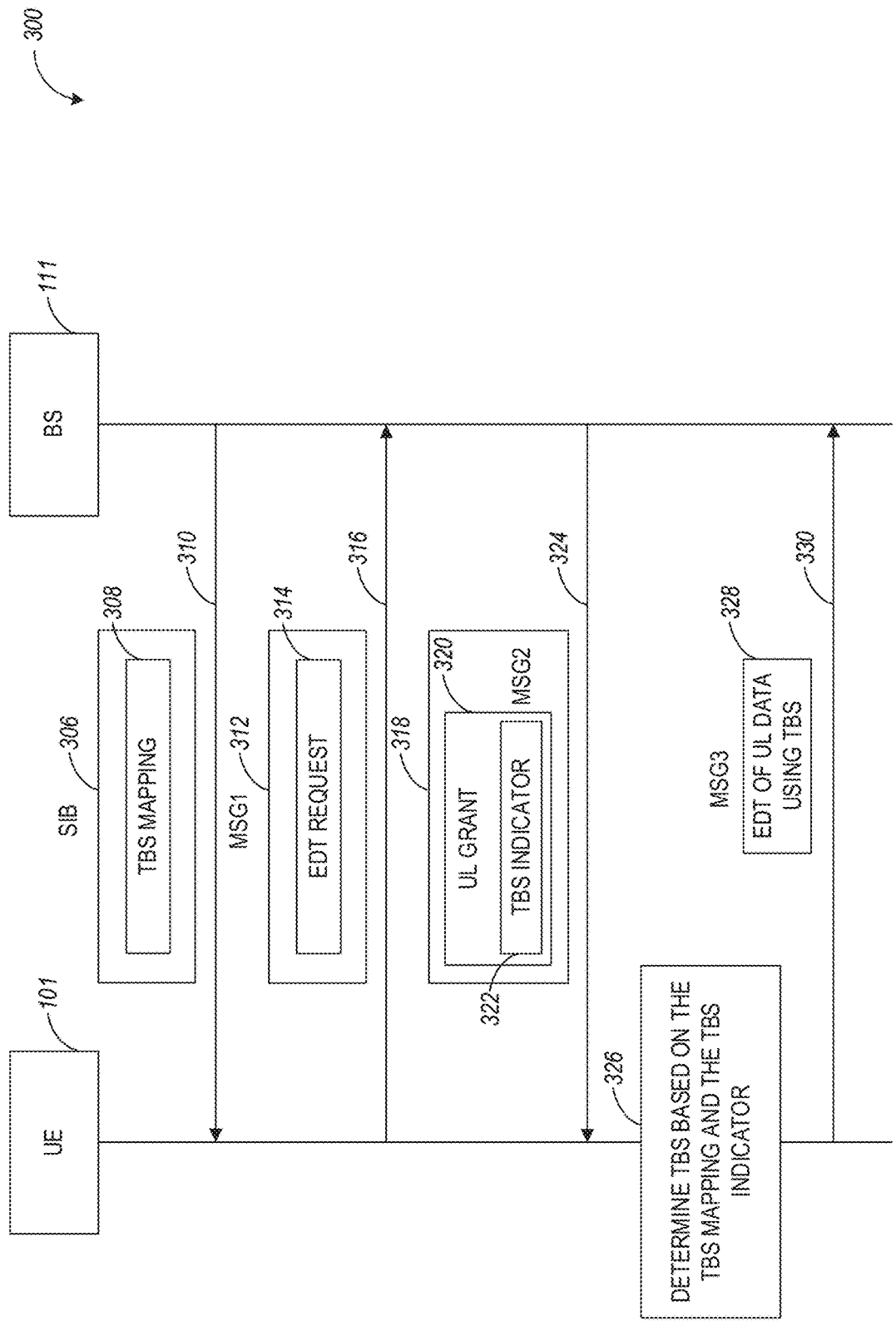
FIG. 3 illustrates a communication exchange between a UE and a base station for configuring early data transmission, in accordance with some aspects.

FIG. 3 illustrates a communication exchange 300 between a UE (e.g., UE 101) and a base station (e.g., 111) for configuring early data transmission, in accordance with some aspects. Referring to FIG. 3, during a PRACH procedure, the UE 101 can communicate MSG1 312 during operation 316, which can include an EDT request 314. In some aspects, the MSG1 can be a dedicated preamble that can be used in connection with EDT configuration (e.g., providing an indication by the UE that EDT is desired). During operation 324, the BS 111 can communicate MSG2 318, which can include a UL grant 320 for sending MSG3. In some aspects, the UL grant 320 can include a TBS indicator 322, which can be used by the UE to determine implicit multiple UL grants, each associated with a different TBS.

For example, MSG2 can include an information element that can provide a flag (not illustrated in FIG. 3) indicating whether or not EDT is allowed for the UE. In some aspects, the flag can be a single indicator bit in MSG2, which (e.g., when set) can indicate the UL grant is for EDT and TBS is determined from parameters broadcast in SIB2. If the flag indicates that EDT is allowed for the UE, then the TBS indicator 322 can be mapped by the UE to one or more other TBS values, which may be smaller than the TBS indicator 322. In this regard, the TBS indicator 322 can indicate a maximum TBS that can be used for MSG3 EDT transmission of UL data, but the UE may select another TBS (mapped to the TBS indicator) based on a size of the UL data (so that resources may be used efficiently and with reduced padding during transmission).

For example, the TBS indicator 322 can provide a maximum TBS value selected from the first column of the following example TBS mapping table, and the allowed implicit TBS values can be selected from the second column of the following table (put another way, each value from the first column is mapped to multiple TBS values in the second column).

Example TBS Mapping Table:

| | |
|---|---|
| 408 | 328, 408 |
| 504 | 328, 408, 456, 504 |
| 504 | 408, 504 |
| 600 | 328, 408, 504, 600 |
| 600 | 408, 600 |
| 712 | 328, 456, 600, 712 |
| 712 | 456, 712 |
| 808 | 328, 504, 712, 808 |
| 808 | 504, 808 |
| 936 | 328, 504, 712, 936 |
| 936 | 504, 936 |
| 1000 | 328, 536, 776, 1000 |
| 1000 | 536, 1000 |

In some aspects, the UL grant can omit a TBS field, and TBS indicator in the UL grant for EDT is implicitly present, indicating edt-TBS broadcast in SIB2.

In some aspects, the TBS mapping 308 of various TBS indicators to one or more other TBS values can be communicated in a configuration or system message by the BS 111 (e.g., as part of a system information block (SIB) 306 transmission during operation 310).

After the UE 101 receives the uplink grant 320 with the TBS indicator 322 in MSG2, the UE can determine a TBS based on the TBS mapping 308 and the TBS indicator 322 at operation 326. For example, the UE can use a TBS mapping table such as the above example TBS mapping table in order to select a TBS that is smaller than or equal to the TBS indicator 322, based on a size of uplink data that is to be transmitted during EDT and using MSG3. At operation 330, MSG3 328 that includes the uplink data is transmitted as EDT.

In some aspects, a TBS indicator is included implicitly in MSG2, and comprises the coverage enhancement (CE) level or a repetition level used to receive the MSG2. For example, a TBS indicator such as edt-TBS can have a value of 1, when the UE is in CE or repetition level 1, and edt-TBS can have a value of 2 when UE is in CE or repetition level 2.

Figure 4:
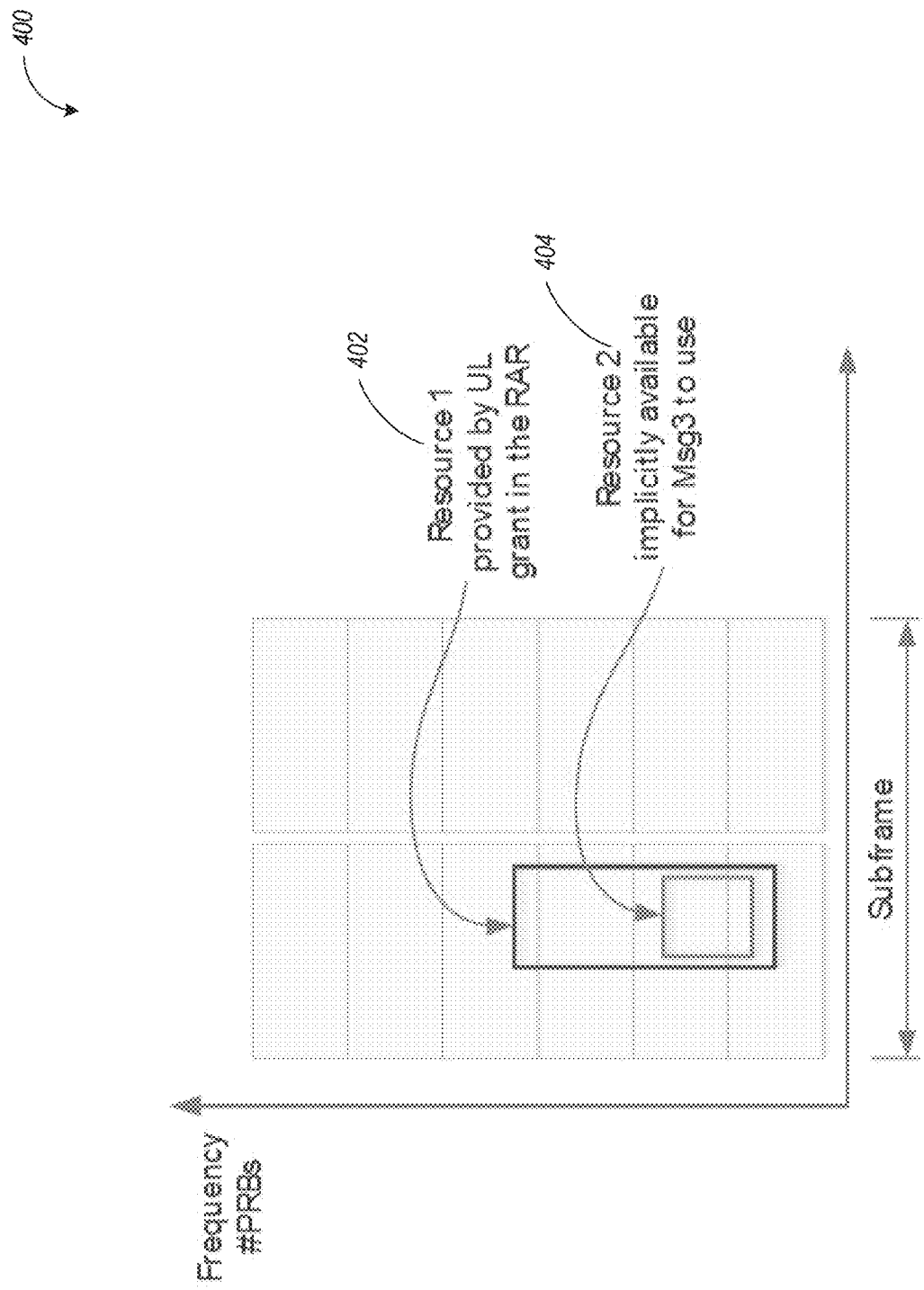
FIG. 4 illustrates an example of implicit multiple grant allocation for Enhanced Machine Type Communications (eMTC), in accordance with some aspects.

FIG. 4 illustrates an example 400 of implicit multiple grant allocation for Enhanced Machine Type Communications (eMTC), in accordance with some aspects. Referring to FIG. 4, after the UE receives an uplink grant in MSG2, a first communication resource 402 can be available to the UE for transmitting uplink data. For example, the first communication resource 402 can corresponds to a maximum TBS such as the TBS indicator 322 and can be used for transmission of legacy data or uplink data for EDT. In aspects where implicit multiple uplink grants are provided, as discussed in connection with FIG. 3, a second communication resource 404 can be selected by the UE based on a different TBS value that is smaller than the maximum TBS value of the TBS indicator 322. The second communication resource 404 can be used to send uplink data during EDT, where the size of the communication resource 404 can be selected based on the size of the EDT uplink data.

In some aspects in connection with FIG. 4, the eNB can provide the resource 402 in the UL grant in RAR in response to the EDT request in MSG1. Resource 404, which is a subset of the resource 402, can also be made available to use to transmit the MSG3. In this case, the UE can choose any of the resources 402 and 404 depending on the TBS requirement to transmit UL data. However, the eNB has to blindly detect which resource was used by the UE. Note that FIG. 4 is an example of resource allocation, and other examples, such as using the same frequency domain resources but a subset of time domain resources, are not precluded.

In some aspects, the eNB can also broadcast whether it supports or not such implicit allocation of multiple grant allocations for EDT. If the cell indicates it does not support implicit allocation, the UE can use only the grant provided in the RAR for EDT.

Referring again to FIGS. 2-3, in some aspects, when a UL grant 320 in the RAR 318 is provided in response to the EDT request 314 in the MSG1 312, the eNB 111 can allocate resource and modulation order for X bits of TBS to transmit the UL data as regular UL grant in the RAR. The TBS of X bits can correspond to the largest TBS that may be scheduled for the UL early data transmission.

In some aspects, implicit UL grants are also carried in the RAR (as mentioned above), by reinterpreting the TBS (or modulation and coding scheme (MCS) or radio units (RU)) repetition/resource allocation field in the UL grant to other values. In other words, the same value in TBS/MCS/RU/repetition/resource allocation fields can be used to indicate multiple possible scheduled TBSs. For example, a mapping from indicated TBS value X can be defined. In this case, the X bits of TBS can be mapped to N number of Yi bits TBS, where Yi=x<X for i=1 . . . N (e.g., as seen in the above example TBS mapping table). In some aspects, N can be set to value 1. As one example, the Y can be the TBS value corresponding to ceil(ITBS/2), where Ims is the TBS index indicated by the UL grant (which corresponds to TBS value of X bits for example).

In some aspects, the mapping from the allocated resources indicated for TBS of X bits to the resources allocated for TBS of Yi bits can also be predefined (e.g., communicated in SIB as seen in FIG. 3), which can be a subset of resources allocated for TBS of X bits. For example, the frequency domain allocated resources can be the same, while the time domain allocated resources (including the number of RUs and repetitions) can be reduced for TBS of Yi bits, e.g. half of the repetitions. Note that the additional resource other than allocated for the X bits of TBS may not be required. The mapping between X and Yi and value of N can be broadcast in system information (e.g., in SIB or MIB), or it can also be predefined in one or more technical specifications.

In some aspects, multiple TBS/MCS/RU tables can be defined, where the TBS/MCS index indicated by the UL grant can be interpreted to corresponding values in the defined tables. Among the possible TBS/MCS/RU/repetition/resource allocation values indicated by the multiple implicit UL grant and the explicit UL grant, UE can autonomously select one set of TBS/MCS/RU/repetition/resource allocation value for MSG3 transmission. The Tables illustrated in FIGS. 5-7C provide examples of multiple TBS tables for efeMTC (e.g., FIGS. 5-6) and feNB-IoT (e.g., FIGS. 7A-7C). Similarly, the number of repetitions required can be mapped to fewer repetitions for smaller TBS sizes. For example, If YA is the number of repetitions indicated for the TBS X bits in the RAR grant for CE mode A, then the number of repetitions required for implicit TBS Y bits can be calculated as next supported number YA/2, if Y<=X/2 or Y<X−Delta, where Delta is an integer.

Figure 5:
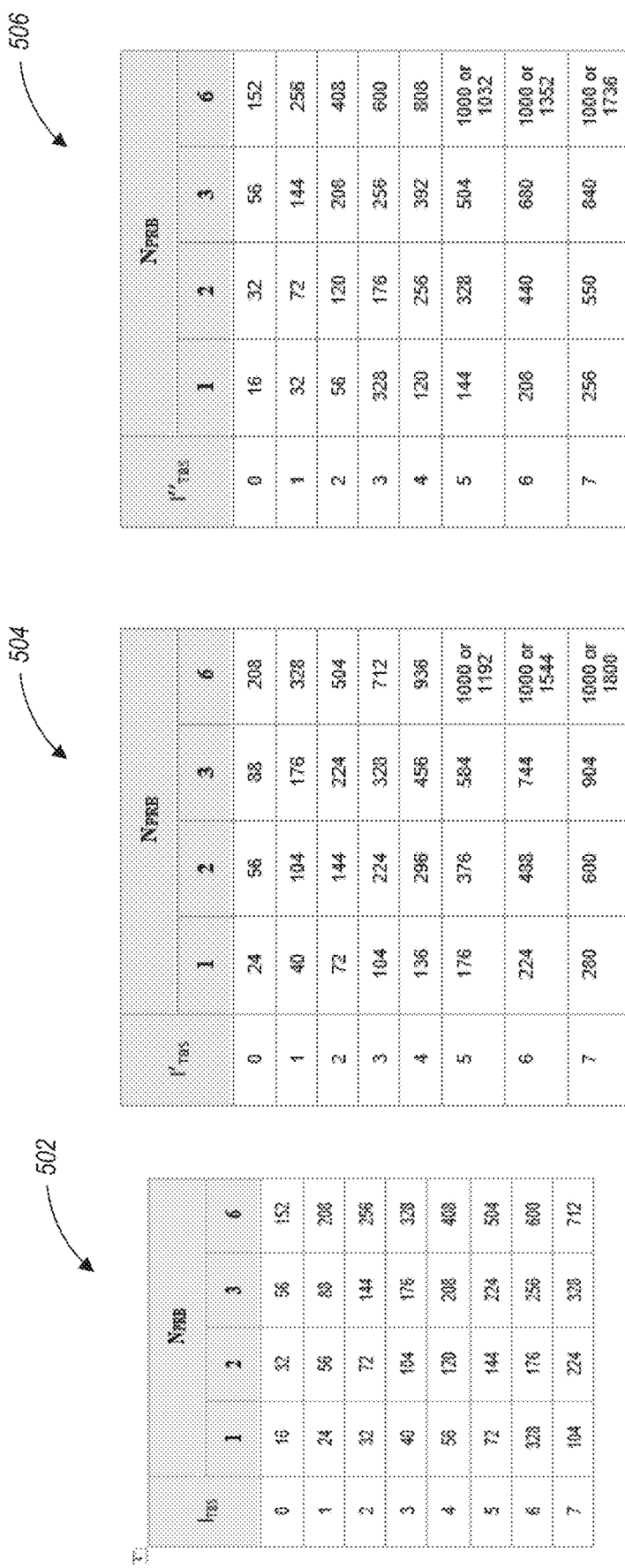
FIG. 5 illustrates an example of multiple transmission block size (TBS) tables for Even-Further-Enhanced Machine Type Communications (eFeMTC) Coverage Enhancement (CE) mode A, in accordance with some aspects.

FIG. 5 illustrates an example of multiple transmission block size (TBS) tables (e.g., Tables 502, 504, and 506) for Even-Further-Enhanced Machine Type Communications (eFeMTC) Coverage Enhancement (CE) mode A, in accordance with some aspects. More specifically, TBS tables 502-506 can be used when UE 101 is configured for efeMTC in CE mode A, where $I'_{TBS}$ of 0, 1, 2, . . . , 7 correspond to $I_{TBS}$ of 1, 3, 5, . . . , 15 respectively when determining the MCS index, and $I''_{TBS}$ of 0, 1, 2, . . . , 7 correspond to $I_{TBS}$ of 0, 2, 4, . . . , 14 respectively when determining the MCS index.

FIG. 6 illustrates an example of multiple TBS tables (e.g., Tables 602, 604, and 606) for Even-Further-Enhanced Machine Type Communications (eFeMTC) Coverage Enhancement (CE) mode B, in accordance with some aspects. More specifically, TBS tables 602-606 can be used when UE 101 is configured for efeMTC in CE mode B, where $I'_{TBS}$ of 0, 1, 2, 3 correspond to $I_{TBS}$ of 1, 3, 5, 7, respectively, when determining the MCS index, and $I''_{TBS}$ of 0, 1, 2, 3 correspond to $I_{TBS}$ of 0, 2, 4, 6 respectively when determining the MCS index.

Referring to FIG. 5 and FIG. 6, in some aspects the TBS index ($I_{TBS}$, $I'_{TBS}$, $I''_{TBS}$) and the number of physical resource blocks (PRBs), or $N_{PRB}$, can be communicated to the UE via the MSG2 or another type of configuration or system information signaling. Additionally, the Tables 502-506 and 602-606 can be communicated to the UE as mapping information (e.g., 306) using system information. Once the UE receives the TBS index and $N_{PRB}$, the UE can select a TBS value from one of the Tables 502-504 and 602-606 to use with EDT of UL data in MSG3 based on the CE mode.

FIG. 7A, FIG. 7B, and FIG. 7C illustrate multiple TBS tables (e.g., Tables 700A, 700B, and 700C) for Further Enhanced Narrowband Internet-of-Things (FeNB-IoT) communications, in accordance with some aspects. Referring to FIGS. 7A-7C, in connection with NB-IoT communication architecture, the illustrated Tables can be pre-defined (e.g., in a specification or communicated to the UE via higher layer signaling, system information, or other types of configuration signaling). The UL grant in RAR can include 3 bits to indicate the MCS index that can be mapped to TBS, modulation, and number of RUs for MSG3. Once the UE receives the MCS index (e.g., via MSG2), the UE can autonomously select the row in the table (and obtain modulation, RUs, and TBS, which can be used for EDT). In some aspects, each of the tables 700A-700C can include more than one rows. For example, if a table has 3 rows, the UE can choose one of the three rows to transmit the UL data and eNB has to blindly decode which row from the table the UE used to transmit the UL data.

In some aspects, for UEs which have the capability to support early data transmission, multiple implicit UL grants can be supported as well. Alternatively, a UE can be configured to support only early data transmission, or both early data transmission and multiple implicit UL grants. For the latter case, further (N)PRACH partitioning may be needed for the UE to indicate the capability of support of multiple grants, besides the partitioning needed for indication of support of early data transmission.

In some aspects, the eNB can dynamically indicate (e.g., using a reserved bit in DCI or RAR) whether the UE can use implicit multiple UL grants for smaller TBS sizes. In another aspect, a fixed number of TBSs can be defined and used (for example TBS=1000 and TBS=712), for which only the implicit multiple grants may be available.

In some aspects, MSG1 can also indicate the size of TBS the UE intends to transmit for the early data transmission. Only for some of the highest TBS sizes, multiple explicit UL grants are made available. This information can be broadcast in system information. For example, MSG1 indicates whether it wants the UL grant for a maximum supported TBS or a minimum supported TBS.

In some aspects, if MSG1 indicates the UE requests UL grant for a minimum supported TBS, there may be no implicit UL grants available and the UE can be configured to use only the grant provided in the RAR. If MSG1 indicates the UE request UL grant for a maximum supported TBS, the implicit UL grants for smaller supported TBS, but larger than the minimum supported TBS, can be made available in addition to the one provided in RAR.

Figure 8:
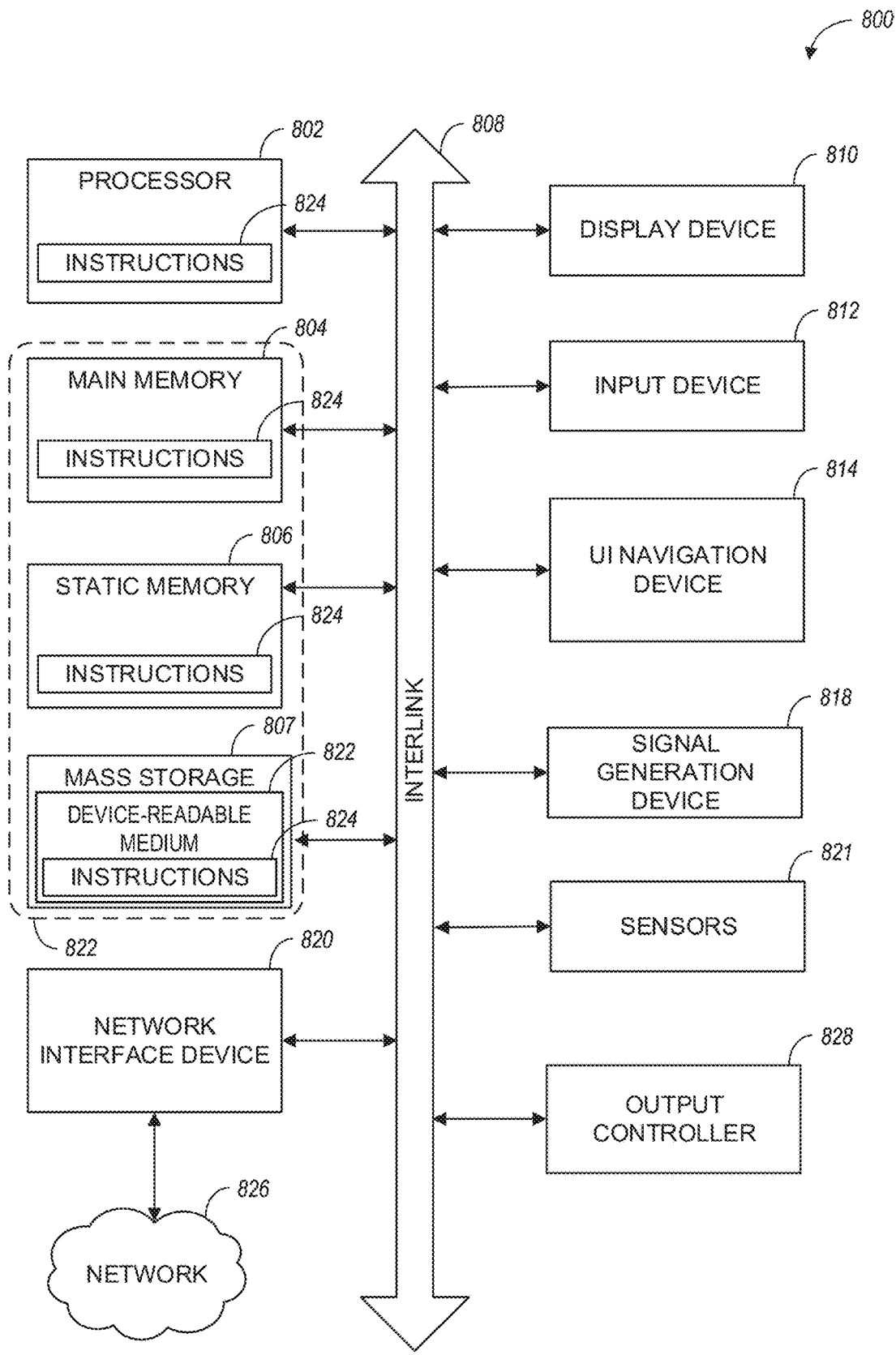
FIG. 8 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 8 illustrates a block diagram of a communication device such as an evolved Node-B (eNB), a next generation Node-B (gNB), an access point (AP), a wireless station (STA), a mobile station (MS), or a user equipment (UE), in accordance with some aspects and to perform one or more of the techniques disclosed herein. In alternative aspects, the communication device 800 may operate as a standalone device or may be connected (e.g., networked) to other communication devices.

Circuitry (e.g., processing circuitry) is a collection of circuits implemented in tangible entities of the device 800 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 800 follow.

In some aspects, the device 800 may operate as a standalone device or may be connected (e.g., networked) to other devices. In a networked deployment, the communication device 800 may operate in the capacity of a server communication device, a client communication device, or both in server-client network environments. In an example, the communication device 800 may act as a peer communication device in peer-to-peer (P2P) (or other distributed) network environment. The communication device 800 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 800 may include a hardware processor 802 (e.g., a central processing unit (CPU), a graphics processing unit (GPU), a hardware processor core, or any combination thereof), a main memory 804, a static memory 806, and mass storage 807 (e.g., hard drive, tape drive, flash storage, or other block or storage devices), some or all of which may communicate with each other via an interlink (e.g., bus) 808.

The communication device 800 may further include a display device 810, an alphanumeric input device 812 (e.g., a keyboard), and a user interface (UI) navigation device 814 (e.g., a mouse). In an example, the display device 810, input device 812 and UI navigation device 814 may be a touchscreen display. The communication device 800 may additionally include a signal generation device 818 (e.g., a speaker), a network interface device 820, and one or more sensors 821, such as a global positioning system (GPS) sensor, compass, accelerometer, or another sensor. The communication device 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 807 may include a communication device-readable medium 822, on which is stored one or more sets of data structures or instructions 824 (e.g., software) embodying or utilized by any one or more of the techniques or functions described herein. In some aspects, registers of the processor 802, the main memory 804, the static memory 806, and/or the mass storage 807 may be, or include (completely or at least partially), the device-readable medium 822, on which is stored the one or more sets of data structures or instructions 824, embodying or utilized by any one or more of the techniques or functions described herein. In an example, one or any combination of the hardware processor 802, the main memory 804, the static memory 806, or the mass storage 816 may constitute the device-readable medium 822.

As used herein, the term "device-readable medium" is interchangeable with "computer-readable medium" or "machine-readable medium". While the communication device-readable medium 822 is illustrated as a single medium, the term "communication device-readable medium" may include a single medium or multiple media (e.g., a centralized or distributed database, and/or associated caches and servers) configured to store the one or more instructions 824.

The term "communication device-readable medium" is inclusive of the terms "machine-readable medium" or "computer-readable medium", and may include any medium that is capable of storing, encoding, or carrying instructions (e.g., instructions 824) for execution by the communication device 800 and that cause the communication device 800 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 824 may further be transmitted or received over a communications network 826 using a transmission medium via the network interface device 820 utilizing any one of a number of transfer protocols. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input-multiple-output (SIMO), MIMO, or multiple-input-single-output (MISO) techniques. In some examples, the network interface device 820 may wirelessly communicate using Multiple User MIMO techniques.

The term "transmission medium" shall be taken to include any intangible medium that is capable of storing, encoding or carrying instructions for execution by the communication device 800, and includes digital or analog communications signals or another intangible medium to facilitate communication of such software. In this regard, a transmission medium in the context of this disclosure is a device-readable medium.

A communication device-readable medium may be provided by a storage device or other apparatus which is capable of hosting data in a non-transitory format. In an example, information stored or otherwise provided on a communication device-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the communication device-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus comprising:
one or more processors, wherein to configure a user equipment (UE) for early data transmission (EDT), the one or more processors are configured to:
encode a physical random access channel (PRACH) preamble for transmission to a base station as a PRACH procedure Message 1 (MSG1), the PRACH preamble including a request for EDT;
decode a random-access response (RAR) message, the RAR message received from the base station as a PRACH procedure Message 2 (MSG2) and including an uplink (UL) grant for the EDT;
select, autonomously, for the UL grant for the EDT, a transmission block size (TBS) from a plurality of available TBSs indicated by a TBS indicator received from the base station; and
encode UL data for the EDT to the base station as a PRACH procedure Message 3 (MSG3) using the UL grant and the selected TBS, wherein any of the available TBSs can be selected by the UE for transmission in MSG3 after transmission of the PRACH preamble including a request for EDT.

2. The apparatus of claim 1, wherein different TBS indicators indicate respective pluralities of available TBSs.

3. The apparatus of claim 1, wherein the plurality of available TBSs are a subset of the TBSs allowed for EDT.

4. The apparatus of claim 1, wherein the TBS indicator specifies a maximum TBS size and each TBS of the plurality of available TBSs associated with a respective TBS indicator is smaller than or equal to an associated maximum TBS size.

5. The apparatus of claim 1, wherein the one or more processors are further configured to:
determine an MSG3 repetition level based on the selected TBS; and
cause repetition of the transmission of the MSG3 using the MSG3 repetition level.

6. The apparatus of claim 1, wherein the one or more processors are further configured to:
select the TBS from the plurality of available TBSs based on a size of the UL data.

7. The apparatus of claim 1, wherein the UL grant in the MSG2 further includes a number of physical resource blocks (PRBs) for the EDT, and wherein the one or more processors are further configured to:
select the TB S from the plurality of available TBSs further based on the number of PRBs.

8. The apparatus of claim 1, wherein the UL grant in the MSG2 further includes a modulation and coding scheme (MCS) index, and wherein the one or more processors are further configured to:
select the TBS from the plurality of available TBSs further based on the MCS index.

9. The apparatus of claim 1, further comprising transceiver circuitry coupled to the one or more processors; and, one or more antennas coupled to the transceiver circuitry.

10. The apparatus of claim 1, wherein the base station is one of an Evolved Node-B (eNB) or a Next Generation Node-B (gNB).

11. An apparatus comprising:
one or more processors, wherein to configure a User Equipment (UE) for early data transmission (EDT), the one or more processor are configured to cause a base station to:
decode a physical random access channel (PRACH) preamble from the UE, the PRACH preamble received as a PRACH procedure Message 1 (MSG1), and the PRACH preamble including a request for the EDT;
encode a random-access response (RAR) message for transmission to the UE as a PRACH procedure Message 2 (MSG2), the MSG2 including an uplink (UL) grant for the EDT; and
decode UL data for the EDT, the UL data received from the UE as a PRACH procedure Message 3 (MSG3) based on the UL grant and a transmission block size (TBS) selected from a plurality of available TBSs, wherein any of the available TBSs can be selected by the UE for transmission in MSG3 after transmission of the PRACH preamble including a request for EDT, and wherein the plurality of available TBSs are indicated by a TBS indicator transmitted by the base station.

12. The apparatus of claim 11, wherein different TBS indicators indicate respective pluralities of available TBSs.

13. The apparatus of claim 11, wherein the plurality of available TBSs are a subset of the TBSs allowed for EDT.

14. The apparatus of claim 11, wherein the UL grant in the MSG2 further includes a number of physical resource blocks (PRBs) for the EDT, and wherein the TBS is selected from the plurality of available TBSs further based on the number of PRBs.

15. The apparatus of claim 11, wherein the UL grant in the MSG2 further includes a modulation and coding scheme (MCS) index, and wherein the TBS is selected from the plurality of available TBSs further based on the MCS index.

16. A non-transitory computer-readable storage medium that stores instructions for execution by one or more processors of a user equipment (UE), the instructions to configure the one or more processors to cause the UE to:
- encode a physical random access channel (PRACH) preamble for transmission to a base station as a PRACH procedure Message 1 (MSG1), the PRACH preamble including a request for early data transmission (EDT);
- decode a random-access response (RAR) message, the RAR message received from the base station as a PRACH procedure Message 2 (MSG2) and including an uplink grant for the EDT;
- select, autonomously, for the UL grant for the EDT, a transmission block size (TBS) from a plurality of available TBSs indicated by a TBS indicator received from the base station; and
- encode UL data for the EDT to the base station as a PRACH procedure Message 3 (MSG3) using the UL grant and the selected TBS, wherein any of the available TBSs can be selected by the UE for transmission in MSG3 after transmission of the PRACH preamble including a request for EDT.

17. The non-transitory computer-readable storage medium of claim 16, wherein:
- the TBS indicator comprises a maximum TBS size;
- each TBS of the plurality of available TBSs associated with a respective TBS indicator is smaller than or equal to an associated maximum TBS size.

18. The non-transitory computer-readable storage medium of claim 16, wherein the instructions configure the one or more processors to cause the UE to:
- determine an MSG3 repetition level based on the selected TBS; and
- cause repetition of the transmission of the MSG3 using the MSG3 repetition level.

19. The non-transitory computer-readable storage medium of claim 16, wherein the instructions configure the one or more processors to cause the UE to:
- select the TBS from the plurality of available TBSs based on a size of the UL data.

20. The non-transitory computer-readable storage medium of claim 16, wherein the UL grant in the MSG2 further includes a number of physical resource blocks (PRBs) for the EDT, and the instructions configure the one or more processors to cause the UE to:
- select the TB S from the plurality of available TBSs further based on the number of PRBs.

* * * * *